(12) United States Patent
Zhu et al.

(10) Patent No.: US 8,278,396 B2
(45) Date of Patent: Oct. 2, 2012

(54) CURING AGENTS FOR EPOXY RESINS

(75) Inventors: Pukun Zhu, Irvine, CA (US); Puwei Liu, San Marcos, CA (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/106,924

(22) Filed: May 13, 2011

(65) Prior Publication Data

US 2011/0213096 A1    Sep. 1, 2011

Related U.S. Application Data

(63) Continuation of application No. PCT/US2009/064929, filed on Nov. 18, 2009.

(60) Provisional application No. 61/116,328, filed on Nov. 20, 2008.

(51) Int. Cl.
*C08L 63/02* (2006.01)
*C08L 63/00* (2006.01)

(52) U.S. Cl. ......... 525/404; 525/407; 525/408; 525/409
(58) Field of Classification Search .................. 525/404, 525/407, 408, 409
See application file for complete search history.

(56) References Cited

FOREIGN PATENT DOCUMENTS

| JP | 10265549 A | 10/1998 |
|----|------------|---------|
| JP | 2006137822 A | 6/2006 |
| JP | 2007056152 A | 3/2007 |
| WO | 0188034 A1 | 11/2001 |

*Primary Examiner* — Duc Truong
(74) *Attorney, Agent, or Firm* — Jane E. Gennaro

(57) ABSTRACT

A curing agent for epoxy resin has one or more five- or six-membered aromatic rings, and substituted on the one or more five- or six-membered rings at least two functionalities reactive with the epoxy selected from the group consisting of hydroxyl, amine, imidazole, azine, hydrazide, anhydride, and Lewis acid groups. Choice of functionality can provide a mixed polymer network, one with a more densely cross-linked polymer structure having a high Tg, and the other with a more linear polymer structure to contribute to stress reduction.

1 Claim, No Drawings

CURING AGENTS FOR EPOXY RESINS

CROSS-REFERENCE TO RELATED APPLICATIONS

This application is a continuation of International Patent Application No. PCT/US2009/064929 filed Nov. 18, 2009, which claims the benefit of U.S. Provisional Patent Application No. 61/116,328 filed Nov. 20, 2008, the contents of both of which are incorporated herein by reference.

BACKGROUND OF THE INVENTION

Epoxy resins are used as adhesives, coatings, and molding compounds in the manufacture of articles that undergo thermal cycling either during fabrication or operation.

Two common curing agents for epoxy resins are aromatic amines or phenols. Aromatic amine curing agents give higher cross-link density, and consequently higher Tg values than phenol curing agents. It would be desirable to have a curing agent for epoxy resins that give a balance of properties to the cured epoxy.

SUMMARY OF THE INVENTION

This invention is a curable composition comprising an epoxy resin and a curing agent for the epoxy resin that has two or more different functionalities, both reactive with epoxy. The functionalities are those that can either react and form covalent bonds with the epoxy or accelerate the epoxy curing reaction. The presence of the two or more different functionalities on the curing agent will cause the formation of mixed epoxy polymer networks, which can enhance the physical and mechanical properties of the cured epoxy.

DETAILED DESCRIPTION OF THE INVENTION

The curing agent will be a compound having one or more five- or six-membered aromatic rings, and substituted on the one or more five- or six-membered rings at least two functionalities selected from the group consisting of hydroxyl, amine, imidazole, azine, hydrazide, anhydride, and Lewis acid groups. The five- or six-membered aromatic ring optionally may contain heteroatoms (nitrogen or sulfur); optionally may be fused to one or more other aromatic or aliphatic cyclic rings; and optionally may contain an electron-withdrawing or electron-donating group.

Exemplary structures of these curing agents include

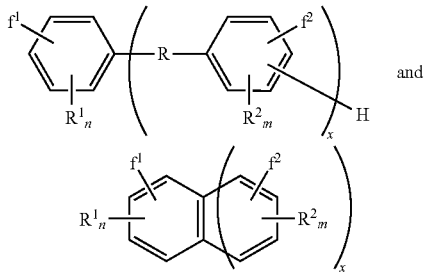

in which $f^1$ and $f^2$ independently are selected from the group consisting of hydroxyl, amine, azine, hydrazide, anhydride, imidazole or Lewis acid, provided that $f^1$ and $f^2$ are different; (the repeating aryl rings in the first structure, non-fused, connected by R, can be connected at the ortho, meta, or para positions on the benzene ring);

n and m independently are numerals from 0 to 4, provided that when n is 0, x is at least 1;

x is a numeral from 0 to 100, preferably 0 to 20, provided that when x is 0, n is at least 1 and $R^1$ is $f^2$;

R is a monovalent or polyvalent radical, which includes hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxanes, polysiloxane-polyurethane block copolymers, and combinations of any of the above linked with one or more linking groups selected from the group consisting of a covalent bond, —O—, —S—, —NR³—, —O—C(O)—, —O—C(O)—O—, —O—C(O)—NR³—, —NR³—C(O)—, —NR³—C(O)—NR³—, —N=N—, —S—C(O)—,

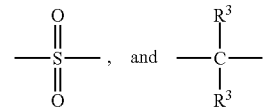

in which $R^3$ is independently for each position selected from the group consisting of hydrogen, alkyl, alkylene, alkoxy, acrylate, aryl, and maleimide;

$R^1$ and $R^2$ independently are selected from the group consisting of —R, —H, —CH₃, —OCH₃, —O(CH₂)ₙCH₃, —(CH₂)ₙf³ in which n is a numeral from 1 to 20 and $f^3$ is a hydrocarbyl group containing at least one carbon to carbon unsaturated bond (e.g. a vinyl group, and allyl group, an aryl group);

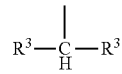

in which $R^3$ independently for each position is selected from the group consisting of hydrogen, alkyl, alkylene, alkoxy, acrylate, aryl, and maleimide; provided that when x is 0, $R^1$ is $f^1$.

The functionalities are chosen so that one will provide a densely cross-linked and high Tg polymer network, and the other a less densely cross-linked and lower Tg polymer network. This combination will provide both strength and toughness (flexibility) in the cured composition.

The introduction of bulky side chains, $R^1$ and $R^2$, on the exemplary structures can increase steric hindrance and thus reduce reactivity and improve the pot life of the formulation. One example of this is depicted in the following reaction scheme:

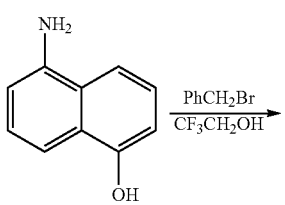

-continued

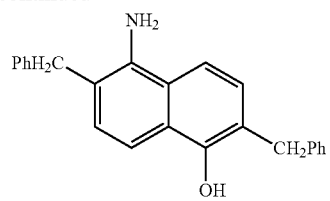

In another embodiment, to further reduce reactivity, a bulky side chain with a carbonyl group can be introduced to stabilize the transition state of the reaction intermediate. This is depicted in the following reaction scheme:

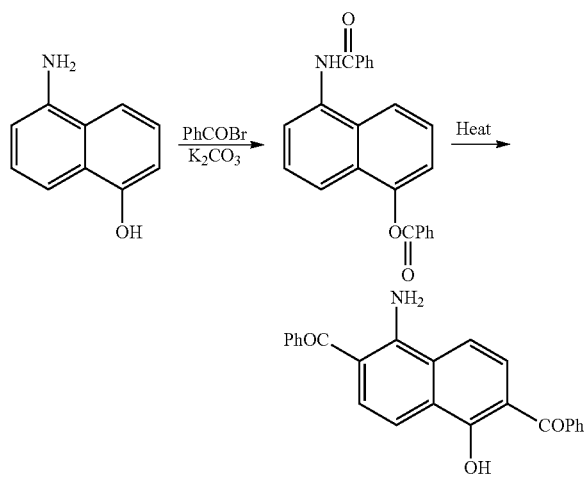

In one embodiment, the curing agents have both amine and phenol functionality. The amine and phenol functionalities work simultaneously to increase cure speed and give balanced performance to the cured adhesive. The amine-cured epoxy component gives a more densely cross-linked, and consequently higher Tg, polymer network than the phenol-cured epoxy component. The phenol-cured epoxy component provides a more linear polymer structure, which contributes to stress reduction.

Particular curing agents are selected from the group consisting of

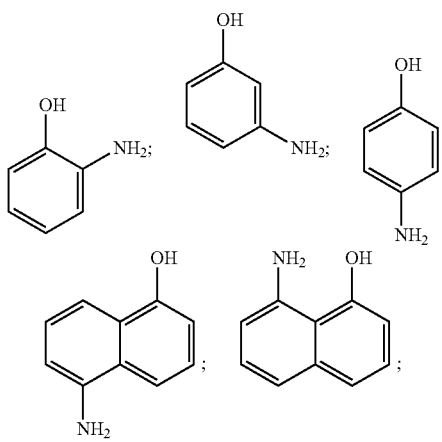

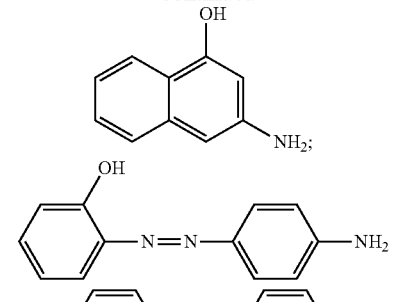

in which $R^1$ and $R^2$ independently are selected from the group consisting of —H; —CH$_3$; —OCH$_3$; —O(CH$_2$)$_n$CH$_3$; and —(CH$_2$)$_n$f$^3$, in which n is a numeral from 1 to 20, preferably 1 to 10, and f$^3$ is a hydrocarbyl group containing at least one vinyl functionality;

and $$R^3—\underset{\underset{H}{|}}{\overset{|}{C}}—R^3$$

in which $R^3$ independently for each position is selected from the group consisting of hydrogen, alkyl, alkylene, alkoxy, acrylate, aryl, and maleimide;

and in which $R^4$ is selected from the group consisting of

—N=N—, —N(H)—, —O—, —S—,

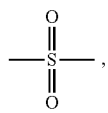

and —(CH$_2$)$_n$—, in which n is a numeral from 1 to 6.

Suitable epoxy resins for formulating the curable compositions include bisphenol, naphthalene, and aliphatic type epoxies. Commercially available materials include bisphenol type epoxy resins (Epiclon 830LVP, 830CRP, 835LV, 850CRP) available from Dainippon Ink & Chemicals, Inc.; naphthalene type epoxy resins (Epiclon HP4032) available from Dainippon Ink & Chemicals, Inc.; aliphatic epoxy resins (Araldite CY179, 184, 192, 175, 179) available from Ciba Specialty Chemicals, (Epoxy 1234, 249, 206) available from Dow, and (EHPE-3150) available from Daicel Chemical Industries, Ltd. Other suitable epoxy resins include cycloaliphatic epoxy resins, bisphenol-A type epoxy resins, bisphenol-F type epoxy resins, epoxy novolac resins, biphenyl type epoxy resins, naphthalene type epoxy resins, and dicyclopentadienephenol type epoxy resins.

The stoichiometric ratio of amine curing agent to epoxy resin should be as close to 1:2 as possible to form a highly cross-linked, dense polymer network. The stoichiometric ratio of phenol curing agent to epoxy should be as close to 1:1 as possible to form a low cross-linked, non-dense polymer network.

In some compositions it may be desirable to include a filler. Suitable nonconductive fillers include silica, calcium carbonate, mica, titania, sand, glass, and polymer fillers. When included, fillers will be present in amounts of 10~90% by weight of the formulation.

Sample formulations include those disclosed in the following table.

EXAMPLES

The compounds used in the Examples were purchased from Aldrich, with the exception that 1-[(2-methyl-1H-imidazole-1yl)methyl]-2-naphthalenol was purchased from Huntsman. The compounds have the following structures:

i.

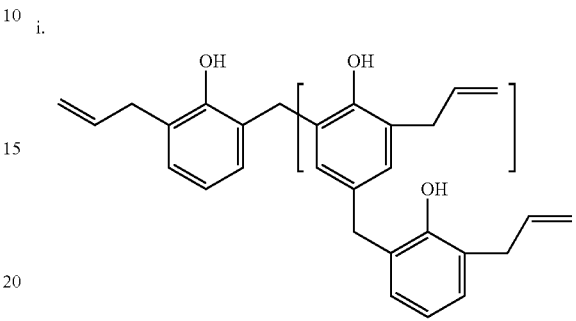

diallyl bis-A phenol b.

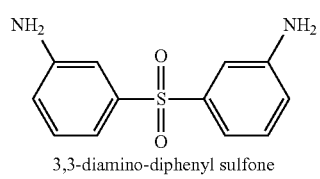

3,3-diamino-diphenyl sulfone c.

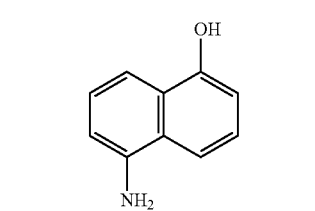

5-amino-1-naphthol

| Ingredient | SAMPLE | | | | | | |
|---|---|---|---|---|---|---|---|
| | 1 wt % | 2 wt % | 3 wt % | 4 wt % | 5 wt % | 6 wt % | 7 wt % |
| Allyl phenol REZICURE 3700 SI Group | 43.82 | | | | | | |
| 3,3'-Diaminodiphenyl sulfone (Chriskev Co.) | | 24.04 | | | | | |
| 5-Amino-1-naphenol | | | 21.30 | | | | |
| 2-Aminophenol | | | | 15.62 | | | |
| 4-Aminophenol | | | | | 15.62 | | |
| 3-Aminophenol | | | | | | 15.62 | |
| 5-Amino-2-methoxyphenol | | | | | | | 19.24 |
| Bisphenol F Diglycidyl Ether Dainippon Ink & Chem. | 56.18 | 75.96 | 78.70 | 84.38 | 84.38 | 84.38 | 80.76 |
| Total weight percent | 100.00 | 100 | 100.00 | 100.00 | 100.00 | 100.00 | 100.00 | d. 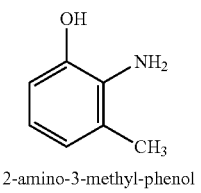

2-amino-3-methyl-phenol e. 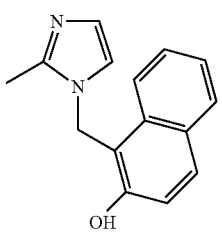

1-[(2-methyl-1H-imidazole-1yl)methyl]-2-naphthalenol f. 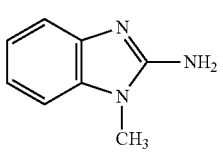

2-amino-1-methylbenzimidazole g. 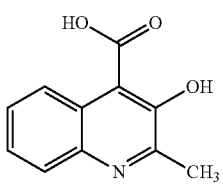

3-hydroxy-2-methyl-4-quinolinecarboxylic acid h. 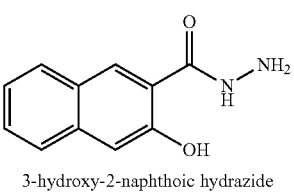

3-hydroxy-2-naphthoic hydrazide i. 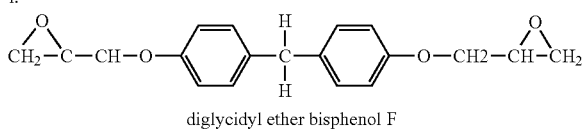

diglycidyl ether bisphenol F j. 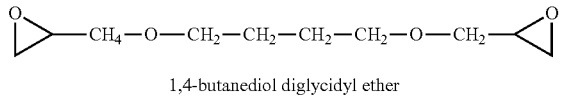

1,4-butanediol diglycidyl ether k. 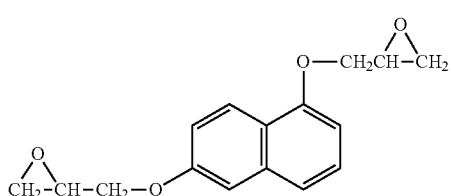

1,6-(2,3-bisepoxypropoxy)naphthalene l. 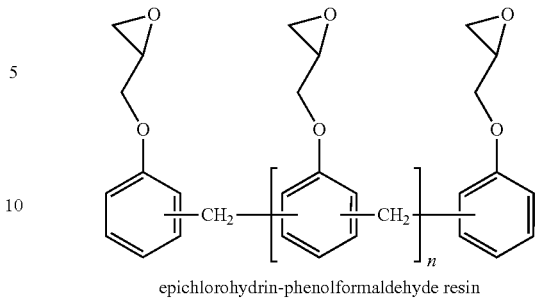

epichlorohydrin-phenolformaldehyde resin

Example 1

Compositions were prepared to have the components shown in Table 1. Diglycidyl ether bisphenol F was employed as the epoxy resin in all compositions. Composition A contained an aromatic amine as the cure agent; composition B contained a phenol as the cure agent. Compositions C to H contained hybrid curing agents in accordance with the invention. The compositions were subjected to Differential Scanning calorimetry (DSC) to effect cure and the temperatures for cure onset, cure peak, and cure exotherm reported. All compositions exhibited exothermal reactions.

TABLE 1

| | A wt % | B wt % | C wt % | D wt % | E wt % | F wt % | G wt % | H wt % |
|---|---|---|---|---|---|---|---|---|
| EPOXY RESIN | | | | | | | | |
| diglycidyl ether bisphenol F | 56 | 75.6 | 78.4 | 82.5 | 95.2 | 97.1 | 66.0 | 79.2 |
| Curing Agent | | | | | | | | |
| diallyl bis-A phenol | 44 | | | | | | | |
| 3,3-diamino-diphenyl sulfone | | 24.4 | | | | | | |
| 5-amino-1-naphenol | | | 21.6 | | | | | |
| 2-amino-3-methyl-phenol | | | | 17.5 | | | | |
| 1-[(2-methyl-1H-imidazole-1yl)methyl]-2-naphthalenol | | | | | 4.8 | | | |
| 2-amino-1-methyl-benzimidazole | | | | | | 2.9 | | |
| 3-hydroxy-2-methyl-4-quinoline-carboxylic acid | | | | | | | 33.4 | |
| 3-hydroxy-2-naphthoic hydrazide | | | | | | | | 20.8 |
| Total | 100 | 100 | 100 | 100 | 100 | 100 | 100 | 100 |
| DSC RESULTS | | | | | | | | |
| onset (° C.) | 195 | 105 | 95 | 73 | 135 | 166 | 162 | 144 |
| 1$^{st}$ peak temp | 274 | 212 | 123 | 114 | 146 | 296 | 180 | 162 |
| DELTA H (J/G) | 173 | 361 | 254 | 237 | 319 | 171 | 232 | 186 |

Example 2

The stoichiometric ratio of curing agent to Bis-F epoxy resin was calculated for the curing agents in Example 1, shown in Table 2.

TABLE 2

| EXAMPLE 1 FORMULATION CURING AGENTS WITH BIS-F EPOXY RESIN | WEIGHT | HEW OR EEW | TOTAL MOLE | MOLE RATIO | WEIGHT % |
|---|---|---|---|---|---|
| A: diallyl bisphenol A | 31.5 | 152 | 0.207 | 0.881 | 44.056 |
| B: diaminodiphenyl sulfone | 12.9 | 62 | 0.208 | 0.884 | 24.386 |
| C: 5-amino-1-naphenol | 11 | 53 | 0.208 | 0.882 | 21.569 |
| D: 2-Amino-3-methylphenol | 8.5 | 41.05 | 0.207 | 0.880 | 17.526 |
| E: 1-[(2-methyl-1H-imidazole-1yl)methyl]-2-naphthalenol | 2 | 250 | 0.008 | 0.034 | 4.762 |
| F: 2-amino-1-methylbenz-imidazole | 1.2 | 147.18 | 0.008 | 0.032 | 2.913 |
| G: 3-hydroxy-2-methyl-4-quinolinecarboxylic acid | 21.1 | 101.95 | 0.207 | 0.880 | 33.977 |
| H: 3-hydroxy-2-naphthoic hydrazide | 10.5 | 50.55 | 0.208 | 0.883 | 20.792 |
| Bis F epoxy resin | 40 | 170 | 0.235 | 1.000 | |

Example 3

A curing agent, 5-amino-1-naphthenol, was used to cure various epoxy compounds, in a molar ratio of curing agent to epoxy of 0.9:1, using DSC. The DSC results are reported in Table 3.

TABLE 3

| Component | HEW/EEW | WEIGHT RATIO | | | |
|---|---|---|---|---|---|
| 5-amino-1-naphenol (curing agent) | 53 | 11.00 | 11.00 | 11.00 | 11.00 |
| Bis-F epoxy EPICLON EXA-830 | 170 | 40.00 | | | |
| linear aliphatic epoxy (78-4574) | 104 | | 24.44 | | |
| naphthalene epoxy (HD4032)(RE1840) | 143 | | | 33.65 | |
| novolac epoxy EPICLON EXA-730A | 176 | | | | 41.41 |
| Mole Ratio curing agent to epoxy | | 0.9 | | | |
| DSC RESULTS | | | | | |
| onset (° C.) | | 99 | 79 | 100 | 110 |
| first peak temp | | 127 | 119 | 117 | 123 |
| DELTA H (J/G) | | 250 | 295 | 196 | 205 |

What is claimed:

1. A curable composition comprising an epoxy resin and a curing agent for the epoxy resin that has the structure

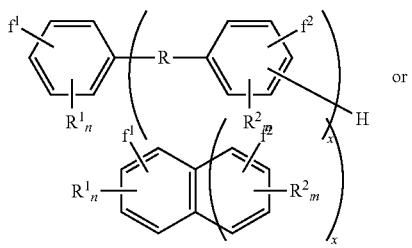

in which f¹ and f² independently are selected from the group consisting of hydroxyl, amine, azine, hydrazide, anhydride, imidazole or Lewis acid, provided that f¹ and f² are different;

n and m independently are numerals from 0 to 4, provided that when n is 0, x is at least 1;

x is a numeral from 0 to 100, provided that when x is 0, n is at least 1 and $R^1$ is $f^2$;

R is a monovalent or polyvalent radical, which includes hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxanes, polysiloxane-polyurethane block copolymers, and combinations of any of the above linked with one or more linking groups selected from the group consisting of —S—, —O—C(O)—, —O—C(O)—O—, —O—C(O)—NR³—, —NR³—C(O)—, —NR³—C(O)—N=N—, and —S—C(O)—, in which R³ is independently for each position selected from the group consisting of hydrogen, alkyl, alkylene, alkoxy, acrylate, aryl, and maleimide;

$R^1$ and $R^2$ independently are selected from the group consisting of —R, —H, —CH₃, —OCH₃, —O(CH₂)ₙCH₃, —(CH₂)ₙ f³ in which n is a numeral from 1 to 20 and f³ is a hydrocarbyl group containing at least one carbon to carbon unsaturated bond; and

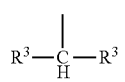

in which R³ independently for each position is selected from the group consisting of hydrogen, alkyl, alkylene, alkoxy, acrylate, aryl, and maleimide.

* * * * *